(12) United States Patent
Jones

(10) Patent No.: US 6,516,866 B1
(45) Date of Patent: Feb. 11, 2003

(54) METHOD OF SIMULTANEOUSLY MOLDING A MELTABLE CORE AND AN OVERMOLD ASSEMBLY

(75) Inventor: Kirk Jones, Fallbrook, CA (US)

(73) Assignee: Fastcore LLC, Fallbrook, CA (US)

( * ) Notice: Subject to any disclaimer, the term of this patent is extended or adjusted under 35 U.S.C. 154(b) by 0 days.

(21) Appl. No.: 09/374,085

(22) Filed: Aug. 12, 1999

(51) Int. Cl.⁷ .......................... B22D 29/00; B29C 33/38
(52) U.S. Cl. .................... 164/132; 164/113; 249/62; 264/221; 264/225; 264/313; 425/175; 425/444; 425/542; 425/556; 425/588
(58) Field of Search ................. 264/219, 221, 264/225, 313; 425/175, 542, 588, 444, 190, 556; 164/6, 15, 132, 113; 249/62

(56) References Cited

U.S. PATENT DOCUMENTS

| | | |
|---|---|---|
| 3,012,315 A | 12/1961 | Stillwagon, Jr. |
| 3,882,220 A | 5/1975 | Ryder |
| 4,145,392 A | 3/1979 | Valyi |
| 4,150,088 A | 4/1979 | Chang et al. |
| 4,464,324 A | 8/1984 | Hager |
| 4,604,258 A | 8/1986 | Valyi |
| 4,614,627 A | 9/1986 | Curtis et al. |
| 4,952,346 A | 8/1990 | Gravelle |
| 4,983,116 A | 1/1991 | Koga |
| 5,061,162 A | 10/1991 | Gravelle |
| 5,085,569 A | 2/1992 | Dauphin |
| 5,173,237 A | 12/1992 | Kidd |
| 5,177,866 A | 1/1993 | Bennett et al. |
| 5,207,964 A | 5/1993 | Mauro |
| 5,257,922 A | 11/1993 | Vansnick et al. ........... 425/127 |
| 5,262,113 A | 11/1993 | Carmien |
| 5,433,912 A | 7/1995 | Shulz et al. |
| 5,435,960 A | 7/1995 | Bressler et al. ............. 264/221 |
| 5,591,466 A | 1/1997 | Bressler et al. |
| 5,614,143 A | 3/1997 | Hager |
| 5,681,518 A | 10/1997 | Ashcraft |
| 5,849,377 A | 12/1998 | Horikoshi et al. |

*Primary Examiner*—Suzanne E. McDowell
(74) *Attorney, Agent, or Firm*—Myers Dawes & Andras; Joseph C. Andras; Vic Y. Lin

(57) ABSTRACT

A simplified lost-core molding system that combines otherwise redundant features such as platens and hydraulic cylinders ordinarily found in separate core molding stations and product molding stations. The preferred system locates the core mold and the product mold between the platens of an injection molding machine and applies a common clamping force to the core mold and to the product mold.

9 Claims, 12 Drawing Sheets

METHOD OF SIMULTANEOUSLY MOLDING A MELTABLE CORE AND AN OVERMOLD ASSEMBLY

BACKGROUND OF THE INVENTION

1. Field of the Invention

The present invention relates generally to a meltable core molding system for forming hollow plastic products by molding plastic over a meltable core and, more particularly, to an improved system wherein the core molding process and overmolding process are combined in one injection molding machine to share a common clamping force and eliminate redundant machinery.

2. Description of the Related Art

Meltable core technology has long been used to make hollow plastic products. A conventional "lost-core" system resides in a large production "cell" consisting of a core molding station, a core cooling station, a product molding station, and a core melting station. The cores and plastic products are typically moved from station to station with one or more robotic carriers or arms.

In general, cores of desired geometry are formed in the core molding station by injecting a molten metal alloy into a suitable core mold. The core is then ejected from the core mold and moved to the core cooling station. After cooling, the core is transferred to the product molding station where it is placed in a product mold block located between the platens of an injection-molding machine. After closing and clamping the product mold under suitable clamp tonnage, molten plastic is injected into the product mold and around the core to form an overmolded assembly. The product mold is opened after a sufficient time has passed for the plastic to cool and become suitably rigid for removal from the mold. The overmolded assembly is then ejected from the product mold and moved to the core melting station where it is placed in a hot oil tank that is at a temperature above the melting point of the core but below the melting point of the plastic. The core material melts out of the overmolded assembly to leave only the hollow plastic product. The molten core material sinks to the bottom of the hot oil tank where it is gathered and returned to the core molding station to make more cores.

Lost-core production cells are capable of producing hollow-core parts such as bicycle and wheelchair wheels, T-fittings, water meter housings, impellers, and so on. Lost-core molding is often not used for such products, however, because its considered too "complicated," too slow, and too expensive in terms of machinery costs, energy usage, maintenance, and so on. As a result, lost-core molding is often used only as a last resort where other molding techniques are unavailable (due typically to intricate part geometries). As one example, a T-fitting is likely to be produced in a conventional injection molding machine that cycles a complicated mold with multiple core-pulls (three) that must remain in position until the part solidifies. As another example, an impeller is likely to be produced in a conventional injection molding machine that runs a mold for producing two sub-components that do not have a hollow core and must be ultrasonically welded together to complete the impeller.

The present invention makes it possible to produce complicated parts (e.g. automotive manifolds and hollow bicycle wheels), that are already being made with lost-core techniques, at less cost. The invention, moreover, makes it cost effective to produce less complicated parts such as T-fittings and impellers with lost-core techniques because, for the first time, the lost-core equipment can be cost effectively acquired, operated and maintained, and can be operated at higher production rates owing to the features of this invention and advantages associated with lost-core techniques in general (e.g. the elimination of dwell-time for parts to solidify before pulling cores in a conventional injection molding process).

The prior art lost-core cells known to these inventors have made less than optimal use of the clamp tonnage available in the injection molding machine used to form the overmold assembly. The core and product molding stations are usually separated because it is generally the companies that make core molding machines who assemble the entire cell. From their point of view, the injection molding machine, the robots, the cooling and so on, orbit around their core molding machine.

Moreover, because the molten metal is usually injected into the core mold at relatively low pressure (e.g. 500 PSI) to provide a flow-like introduction, rather than a spray-like introduction, the core molding machines are often made with correspondingly low clamp tonnage, the result being less than ideal mold closure and "flashing" where some of the injected metal is squeezed out of the mold cavity at the interface between two mold halves. Cores that suffer from flashing must be manually "de-flashed" before being loaded into the injection molding machine.

The use of separate core and product molding stations may impose a longer than otherwise reach requirement on the robot from the core molding station or even worse, require additional robots. For example, two robots may be needed, one to move a hot core to the cooling station and one to move a cool core from the cooling station to the product molding station, to remove an overmolded assembly from the product mold, to replace it with a new core from the cooling station, and to move the overmolded assembly to the core melting station.

In summary, the prior art core molding stations suffer from having the core molding station separate from the product molding station. As a result, the conventional lost-core cell is unnecessarily expensive to purchase, requires excessive floor space, consumes more energy than needed, and is relatively difficult to maintain because it requires redundant molding machines that are separately acquired, located, operated and maintained.

There remains a need, therefore, for a lost-core molding cell of simplified construction and operation.

SUMMARY OF THE INVENTION

The invention is a simplified lost-core molding system that combines otherwise redundant features such as platens and hydraulic cylinders ordinarily found in separate core molding stations and product molding stations. The preferred system locates the core mold and the product mold between the platens of an injection molding machine and applies a common clamping force to the core mold and to the product mold.

In a first aspect, the invention may be regarded as a method of producing a hollow plastic product comprising the steps of: providing molten metal; providing molten plastic; providing an injection molding machine with first and second platens; locating a core mold between the first and second platens; locating a product mold between the first and second platens; loading a core into the product mold; closing the core mold and the product mold by bringing together the first and second platens; clamping the core mold and product mold between the first and second platens with a common clamping force; injecting molten metal into the core mold to form a new core; injecting molten plastic into the product mold and around the core to form an overmolded assembly comprising a hollow plastic product that covers the core; removing the common clamping force; opening the core mold and the product mold by separating the first and second platens; removing the new core from the core mold; removing the overmolded assembly from the product mold; and loading the new core into the product mold.

In a second aspect, the invention may be regarded as molding apparatus adapted for simultaneously forming a core and an overmold assembly comprising: first and second platens that are moveable relative to one another; a core mold located between the first and second platens; a product mold located between the first and second platens; and a source of clamp tonnage for applying a common clamp tonnage to the first and second platens and, thereby, to the core mold and the product mold.

BRIEF DESCRIPTION OF THE DRAWINGS

The just summarized invention may be best understood with reference to the following drawings of which.

DETAILED DESCRIPTION OF THE PREFERRED EMBODIMENTS

Figure 1:
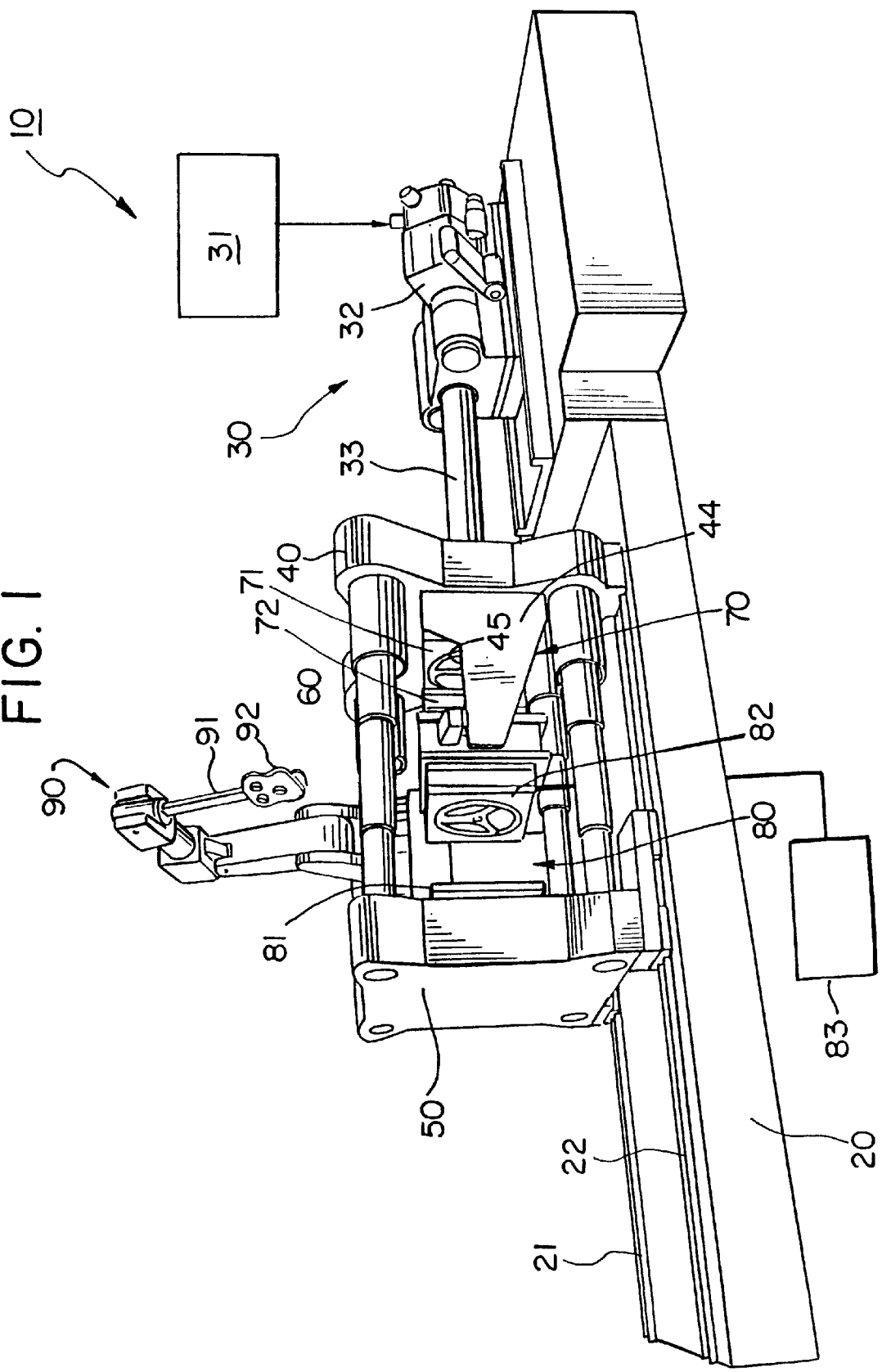
FIG. 1 is a perspective view of a dual purpose molding apparatus 10 according to this invention, the apparatus being shown in the open position at the beginning of a molding cycle where a core and an overmolded assembly are formed with the same clamp tonnage.

FIG. 1 shows a first embodiment of a dual-purpose molding apparatus 10 according to this invention. The apparatus 10 shown is a planned modification to an existing injection molding machine used to make hollow-core bicycle wheels by overmolding cores that were formed in a separate core molding station. In the apparatus 10 of FIG. 1, however, a core and an overmolded assembly are formed at the same time and under the same clamp tonnage.

In more detail, the molding apparatus 10 of FIG. 1 comprises a base 20 which supports a first plate 40 and a second plate 50. The first plate 40 is stationary and fixedly secured to the base. The second plate 50, however, is movable along main support rails 21, 22 of the base 20. The second platen, therefore, is movable back and forth relative to the first platen 40. Also shown is an injection assembly 30 located next to the first stationary platen 40. The injection assembly 30 includes a source 31 of plastic pellets, a feed mechanism 32 and a heated injection barrel 33 that forces molten plastic through a "sprue" in the first platen 40.

As further shown in FIG. 1, the apparatus 10 comprises a product molding region 70 containing a first product mold block 71 and a second product mold block 72 that collectively define the cavity inside of which the injection molded product is formed. Ordinarily, the first and second product mold blocks 71, 72 are secured to the first and second platens 40, 50 so that the mold blocks 71, 72 may be operatively opened and closed to form and inject new products. In the new dual-purpose molding apparatus 10 of FIG. 1, however, the injection molding machine has been modified to include an additional intermediate platen 60 that divides the space between the first and second platens 40, 50 to include a product molding region 70 and a core molding region 80. The core molding region 80 is fed by a source of molten metal 83 as figuratively shown. The core mold, like the product mold, comprises a first core mold block 81 and a second core mold block 82. In the embodiment shown, the first core mold block 81 is secured to the second platen 50 and the second core mold block 82 is secured to the intermediate platen 60. The product mold block 71, remains secured to the first platen 40, but the second product mold block 72 is secured to the intermediate platen 60 opposite to the second core mold block 82. In the preferred embodiment, suitable ejection mechanism for both the product mold and core mold are carried by intermediate platen 60 such that the new core 100 is picked up by one side of the gripping mechanism 92 and the new overmolded assembly 200 is picked up by the opposite side of the gripping mechanism 92. The intermediate platen 60 is supported on a pair of support members 44 extending from the first platen 40. Each of those support members 44 includes an intermediate support rail 45 along which the intermediate platen 60 may be moved relative to the first platen 40.

For use in transporting cores and for unloading overmolded assemblies, a robot 90 having a moveable arm 91 with a suitable gripping mechanism 92 is provided adjacent to the molding apparatus 10. The cyclical operation of the apparatus 10 will now be described with reference to FIGS. 2–10.

Figure 2:
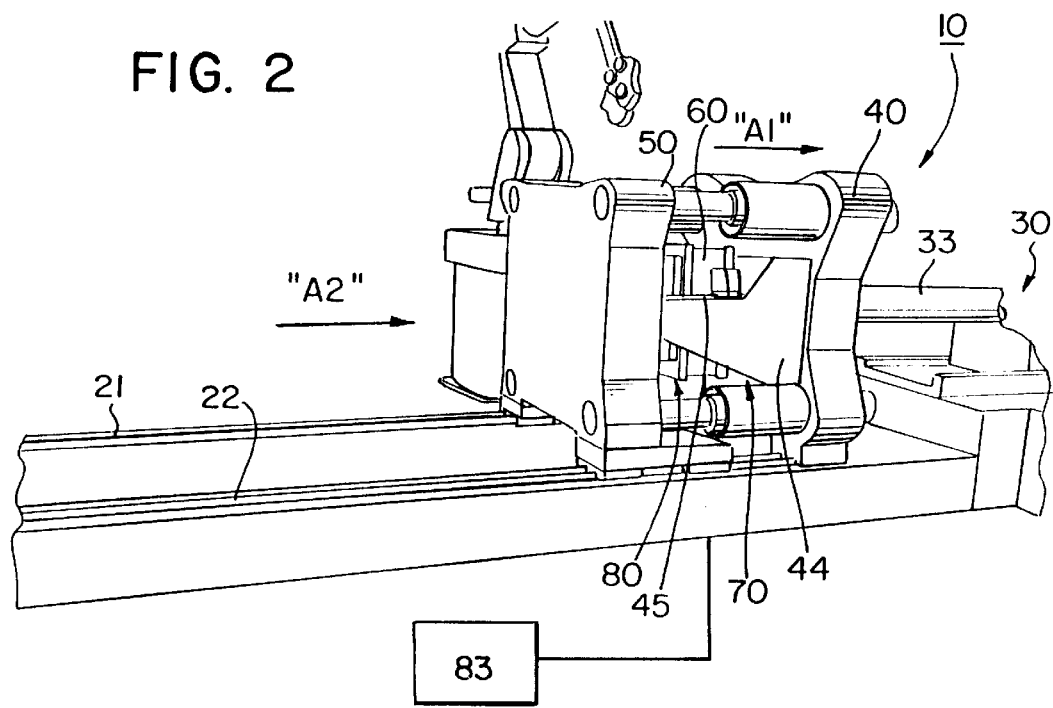
FIG. 2 shows the apparatus 10 with the platens closed and subject to clamp tonnage during which time a new core and a new overmolded assembly are produced.

In FIG. 2, the robot 90 is held out of the way to allow the molding apparatus 10 to close and begin the molding operation. The closing proceeds in two steps as suggested by arrows "A1" and "A2." At step "A1", the intermediate platen 60 is moved toward the stationary platen 40 along the intermediate support rails 45 of the support members 44. Next, as suggested by arrow "A2," the movable platen 50 is moved toward the stationary and intermediate platens 40, 60 to provide full clamp tonnage to simultaneously apply full clamp tonnage to both the product molding region 70 and the core molding region 80. With this clamp tonnage applied, the molten plastic is introduced into the product molding region by way of the heated injection barrel 33 and the molten metal is introduced into the core molding region 80 from the source of molten metal 83.

Figure 3:
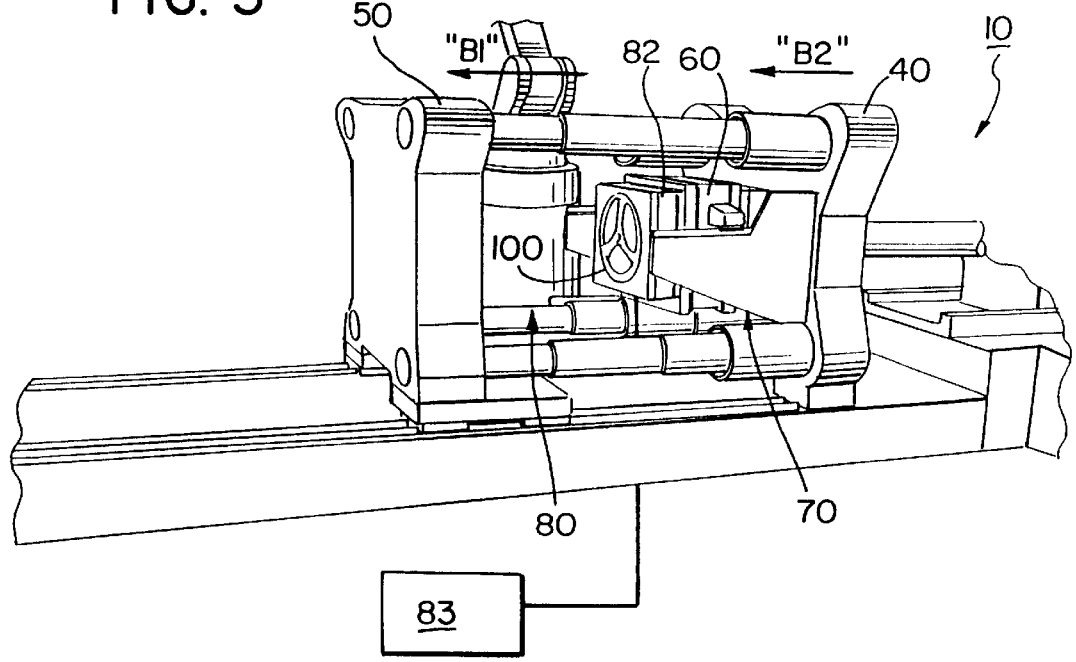
FIG. 3 shows the apparatus 10 with the platens open, a new core 100 being visible.

In FIG. 3, after allowing the core and overmolded assembly to solidify somewhat, the molding apparatus 10 is opened as shown. In particular, the movable plate 50 is moved away from the intermediate and stationary platens 40, 60 as suggested by "arrow B1" and then, the intermediate platen 60 is moved away from the stationary platen 40 as suggested by arrow "B2". At this point, the core molding region 80 and the product molding region 70 are opened and accessible.

Figure 4:
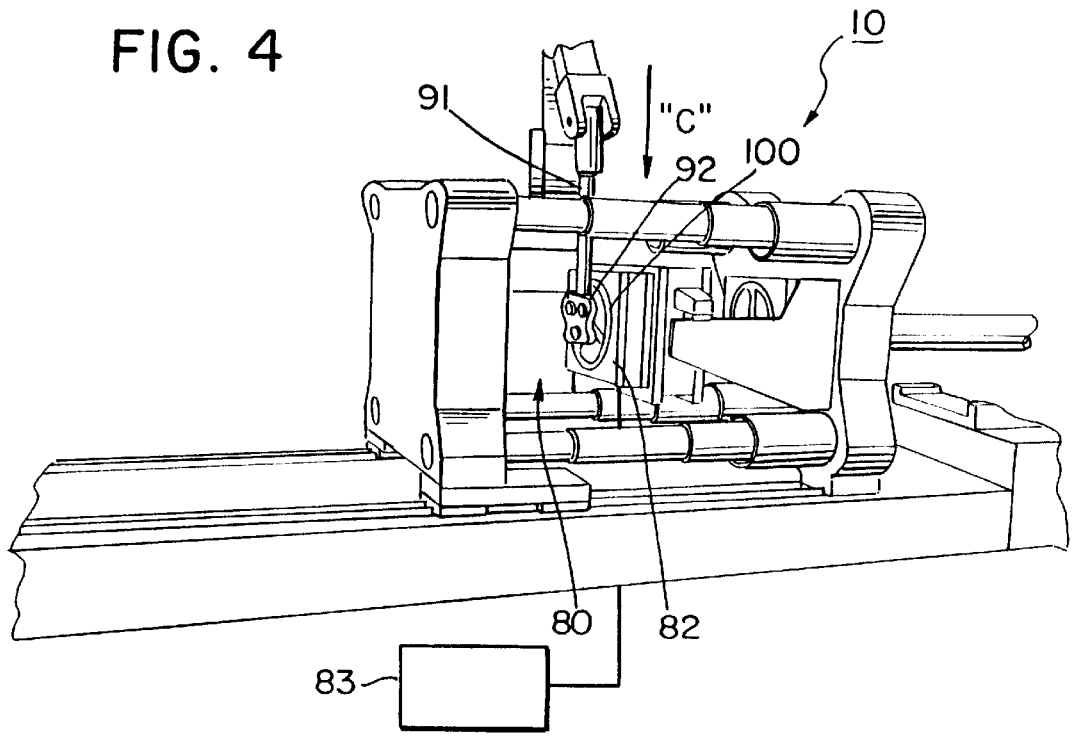
FIG. 4 shows a robot having moved downward into the core molding region to grip the new core 100.

FIG. 4 shows the robot 90 diving into the core molding region 80. In particular, a gripping mechanism 92 carried at the robot's arm 91 far end is brought adjacent to a new core 100. The gripping mechanism 92 contains suitable structure for gripping the new core 100 and lifting it out of and away from the second core mold block 82.

Figure 5:
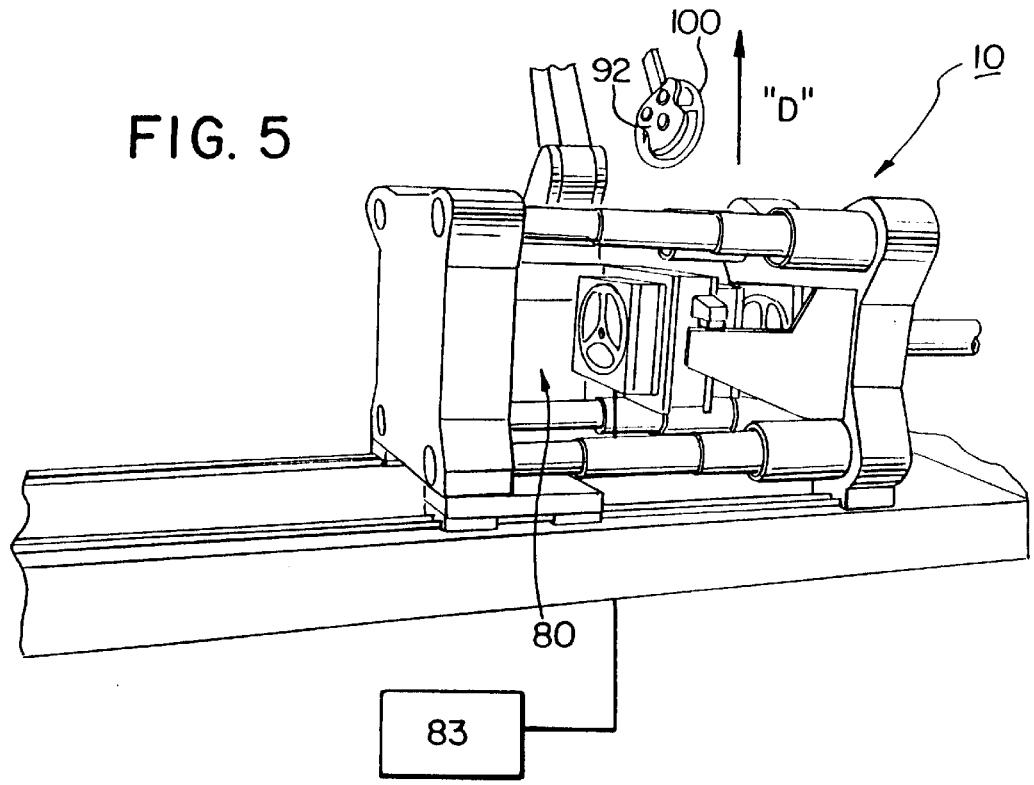
FIG. 5 shows the robot 90 having moved upward from the core molding region with the new core 100.

FIG. 5 shows the robot 90 moving upward as suggested by arrow "D". As a result, the robot's gripping mechanism 92 brings the new core 100 up and out of the core molding station 80.

Figure 6:
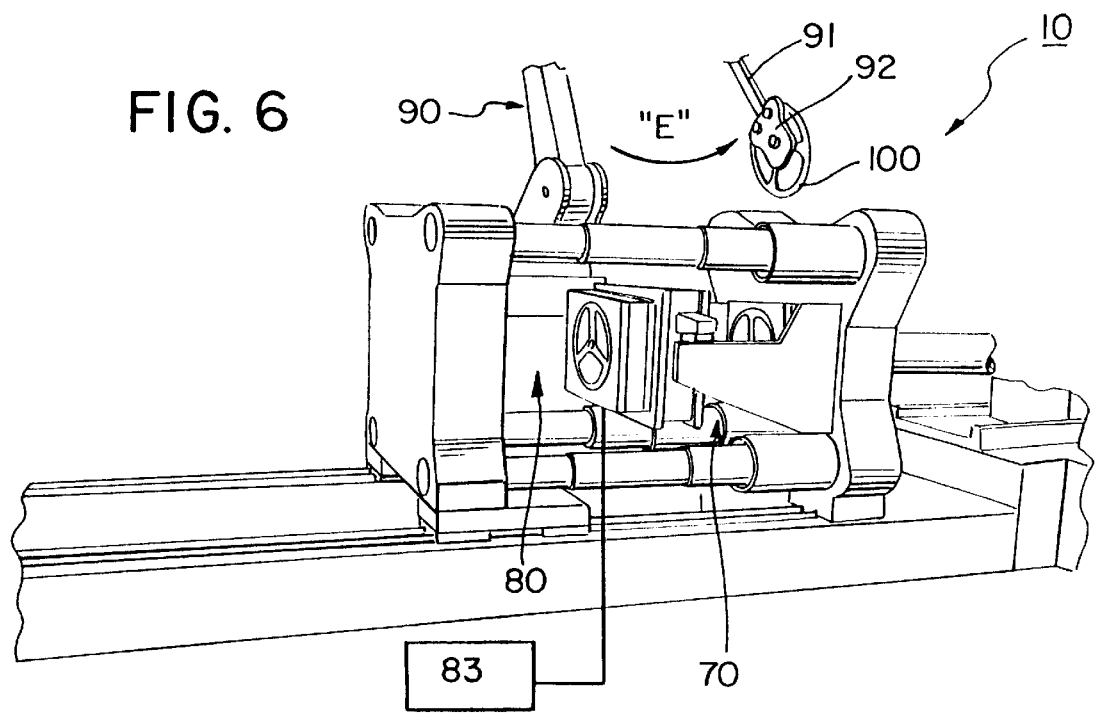
FIG. 6 shows the robot 90 moving the new core 100 over the product molding region.

FIG. 6 shows the robot 90 moving over the product molding region 70 and suggested by arrow "E". At this point, the robot 90 is now ready to move downward into the product molding region 70.

Figure 7:
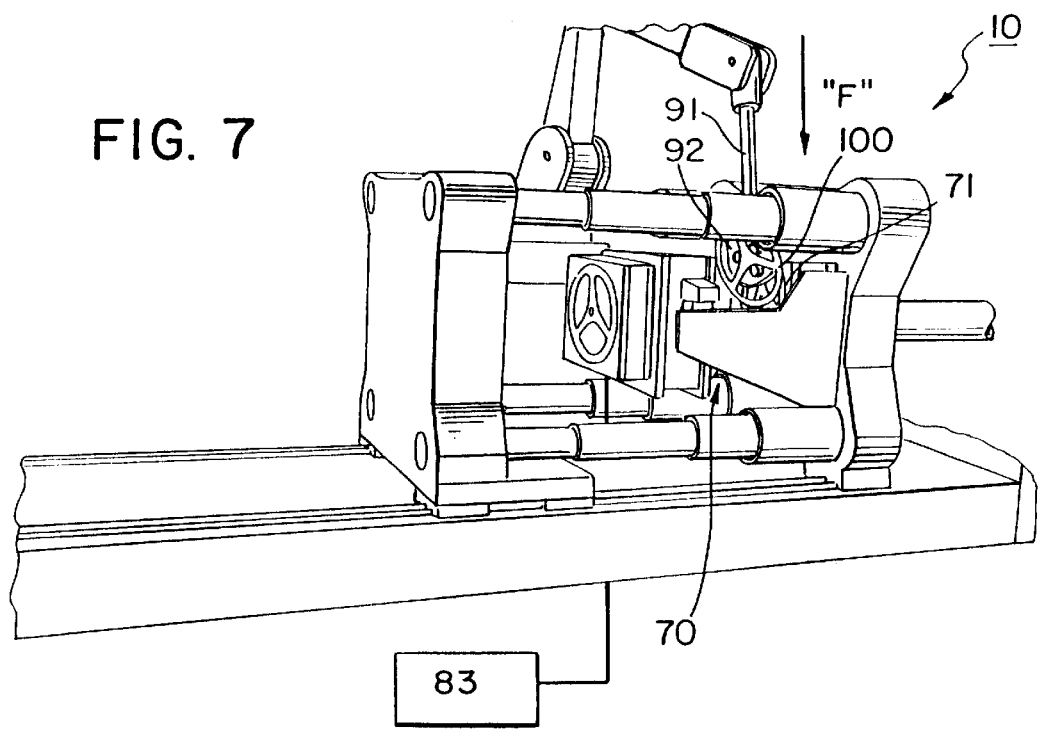
FIG. 7 shows the robot 90 diving downward with the new core 100 into the product molding region, the robot 90 placing the new core 100 on one of the product mold blocks.

FIG. 7 shows the robot 90 diving downward into the product molding region 70 as suggested by arrow "F". When the robot 90 has moved sufficiently downward that the new core 100 carried by its gripping mechanism 92 is located adjacent to the first product mold block 71, then the robot 90 hangs the new core on suitable structure within the mold block 71.

Figure 8:
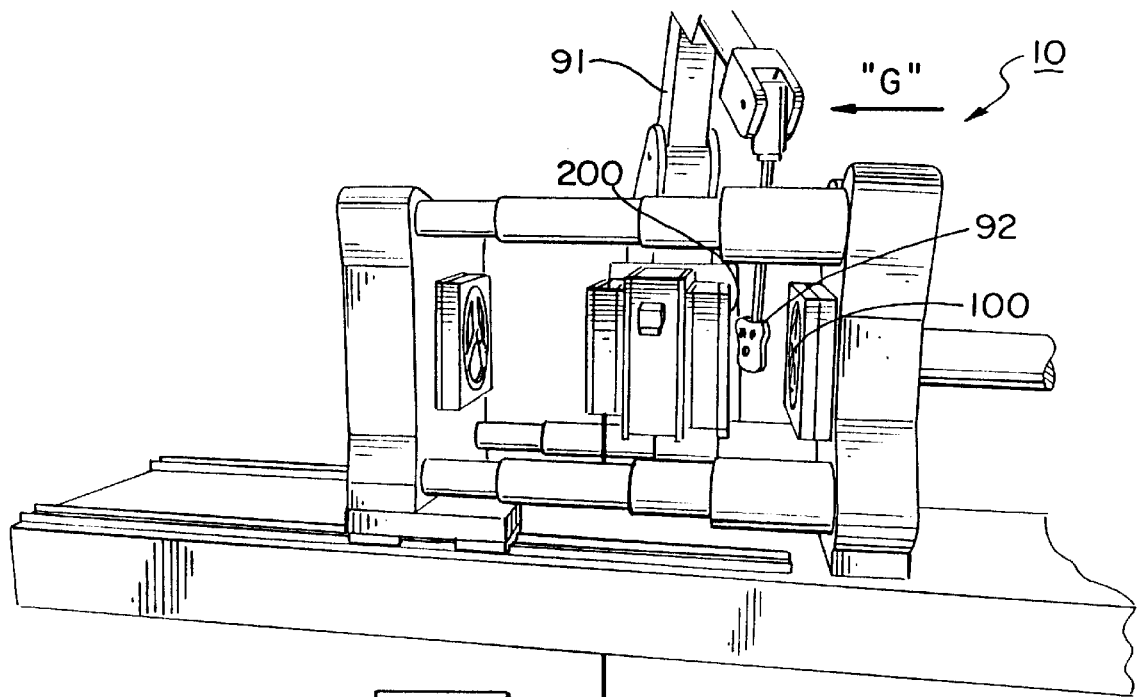
FIG. 8 shows the robot 90 moving from one product mold block to the other product mold block where the robot grips the overmolded assembly 200 that was produced when the apparatus 10 was as shown in FIG. 2.

FIG. 8 shows the robot 90 moving sideways, as suggested by arrow "G" such that an opposite side of the gripping mechanism 92 is brought adjacent to the freshly made overmolded assembly 200. At this position, suitable structure on the gripping mechanism 92 grabs the overmolded assembly 200 in order to transport it out of and away from the molding apparatus 10.

Figure 9:
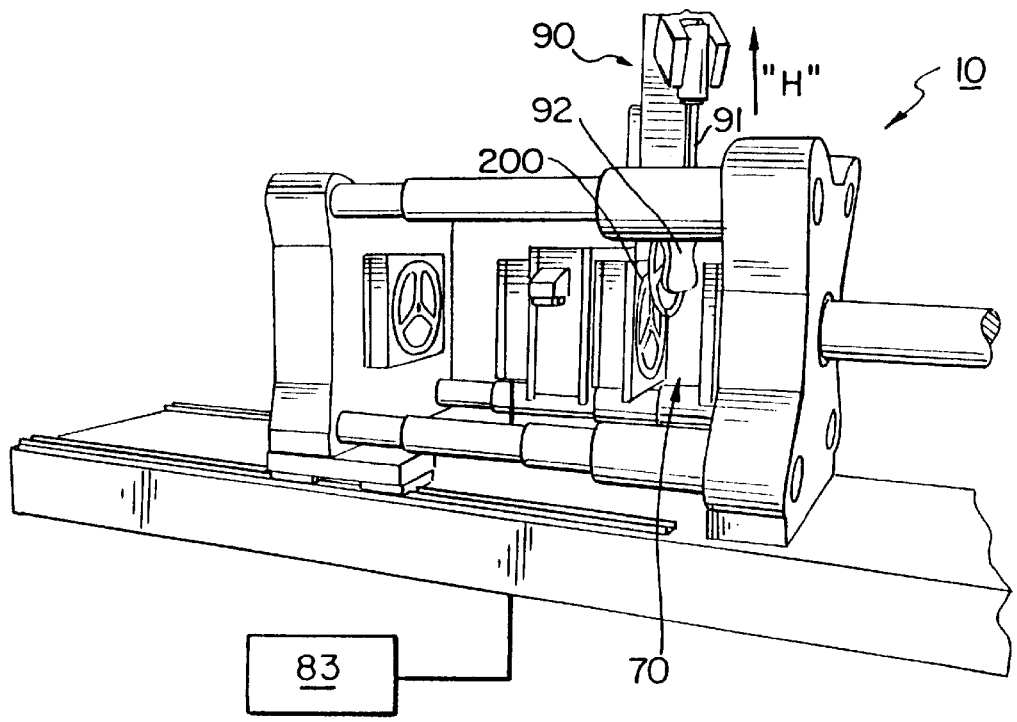
FIG. 9 shows the robot 90 moving upward with the overmolded assembly 200.

FIG. 9 shows the robot 90, as just suggested, moving upward in the direction of arrow "H" with the new overmolded assembly carried by the gripping mechanism 92. Recall that the new core 100 is left behind within the product molding region 70 back in FIG. 7.

Figure 10:
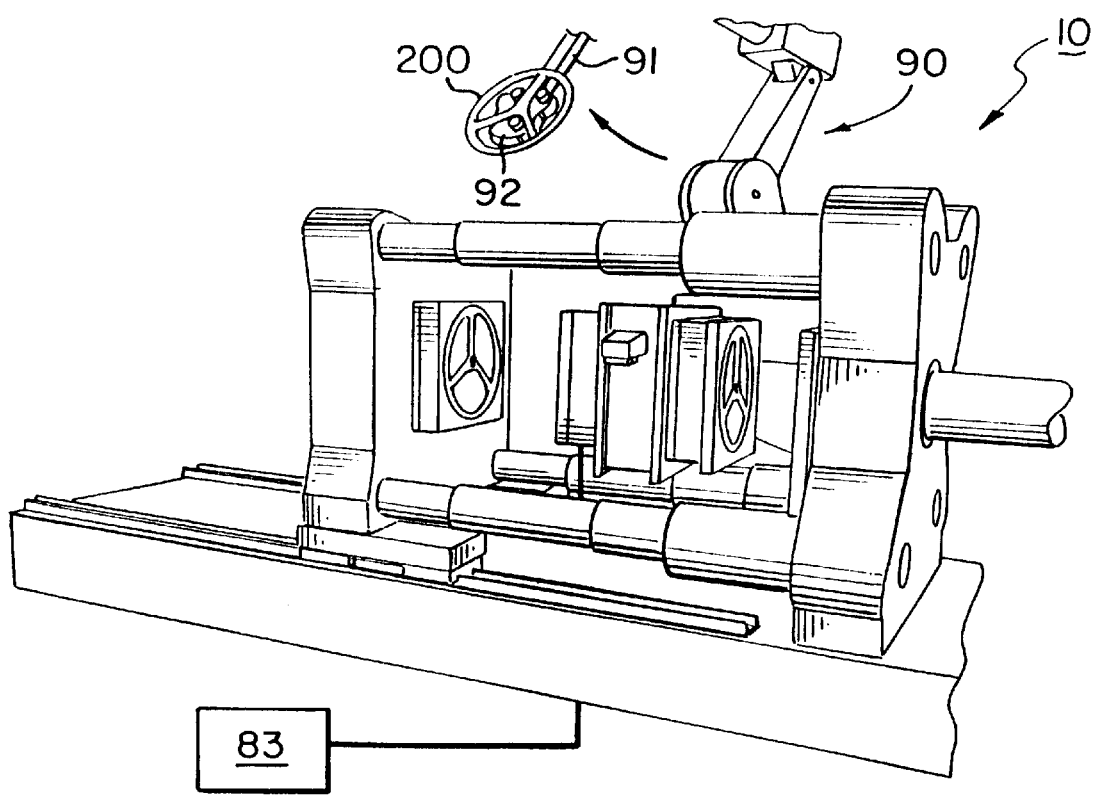
FIG. 10 shows the robot 90 taking the overmolded assembly 200 away from the apparatus 10 for downstream proceeding and a melt-out station.

FIG. 10 shows the robot moving in a direction generally indicated by arrow "I" in order to take the new overmolded assembly 200 to an appropriate melt-out station (not shown). After delivering the overmolded assembly 200 to the melt-out station, the system 10 is in the state originally shown in FIG. 1 and the cycle may repeat.

Figure 11:
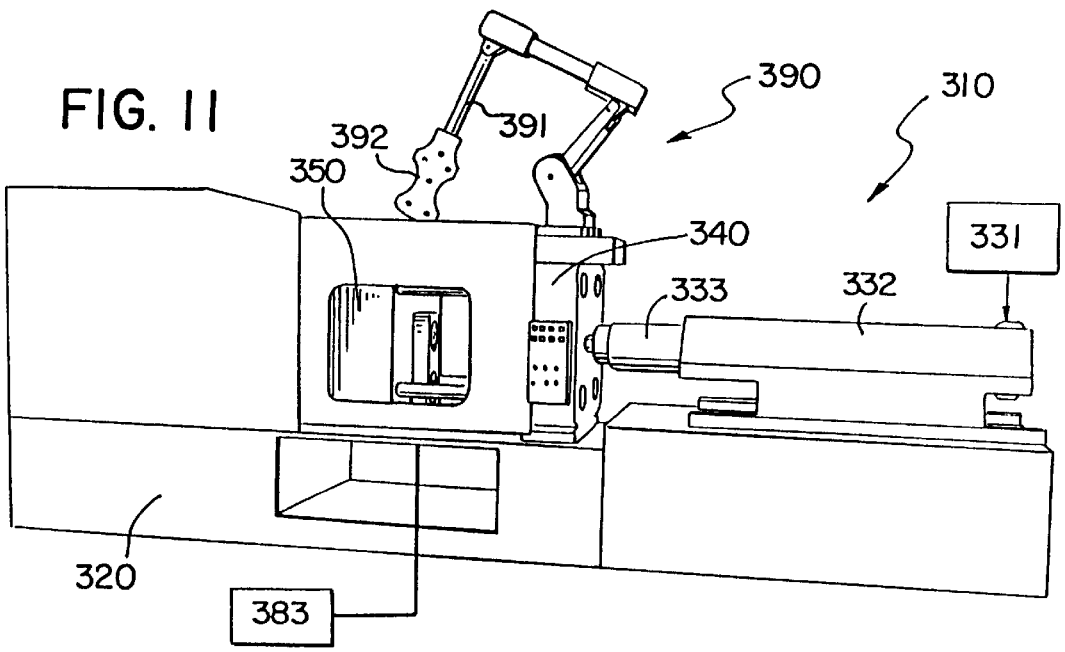
FIG. 11 is a perspective view of a second dual purpose molding apparatus 310 according to this invention, the apparatus being shown in the open position at the beginning of a molding cycle where a core and an overmolded assembly are formed with the same clamp tonnage in an injection molding machine having only two platens, an A-side platen 340 and a B-side platen 350.
Figure 13:
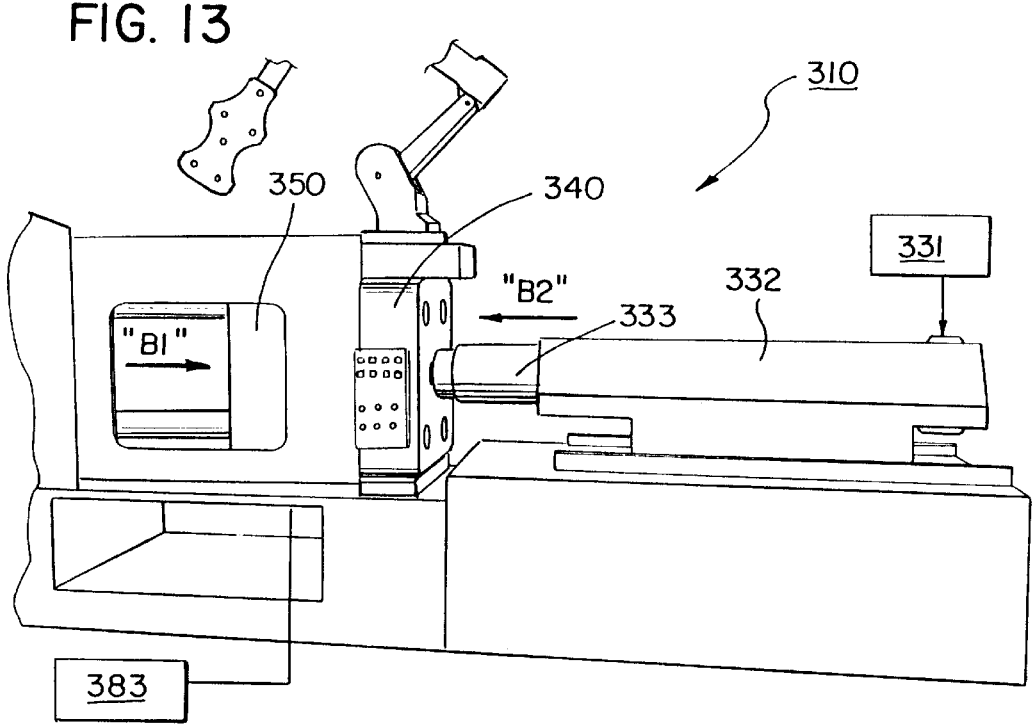
FIG. 13 shows the apparatus 310 with the B-side platen 350 fully clamped against the A-side platen 340 followed by the simultaneous injection of molten plastic into the overmold cavity and the injection of molten metal into the core cavity.
Figure 14:
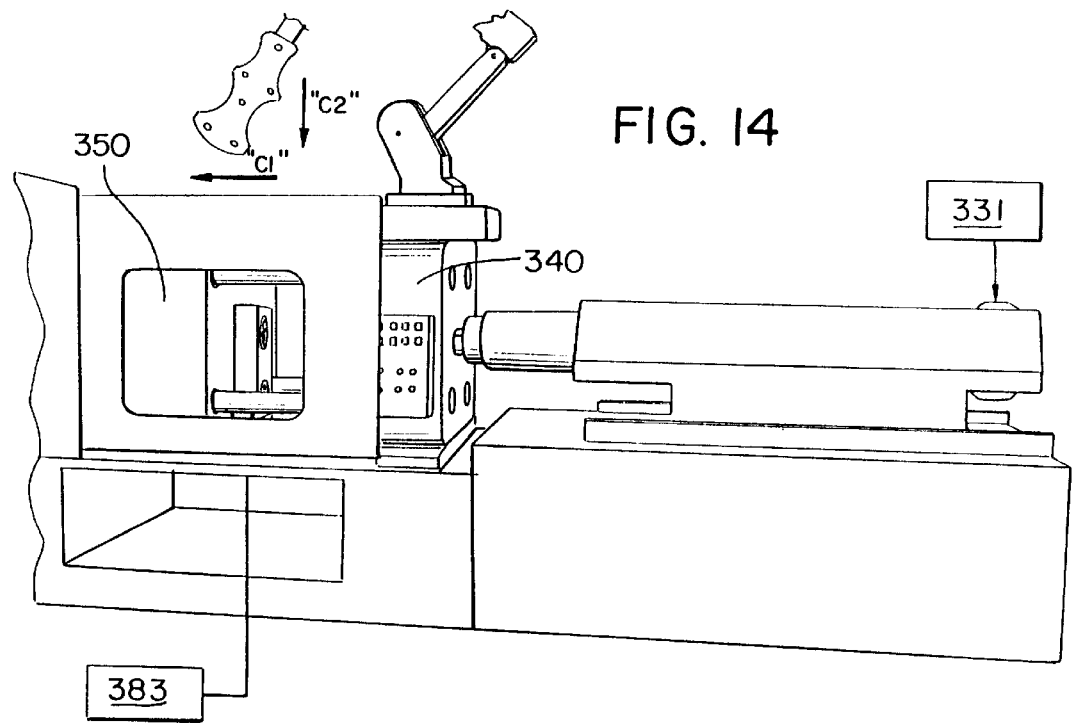
FIG. 14 shows the apparatus 310 with the platens open, a new core and a new overmolded assembly being visible.
Figure 15:
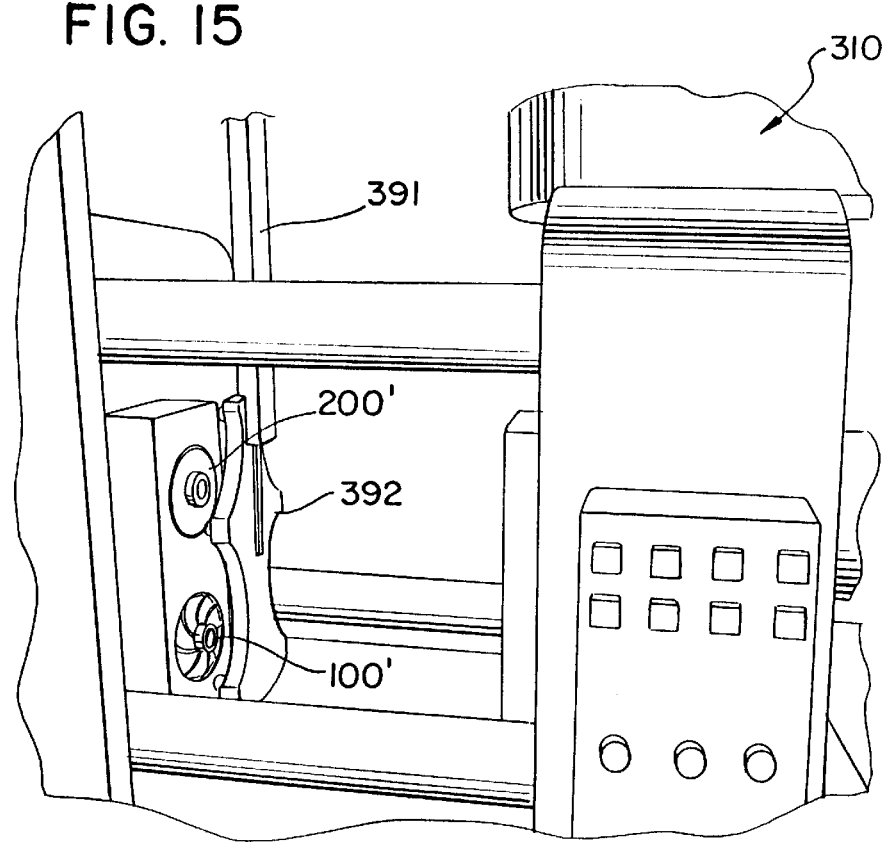
FIG. 15 shows the apparatus 310 with the robot having dived into the space between the platens such that its gripping mechanism is, in this case, simultaneously adjacent to both the new core and the new overmolded assembly.

FIGS. 11–21 show a second preferred, dual molding apparatus 310 that uses only two platens 340, 350 as found in a conventional injection molding machine. As shown in FIG. 11, the molding apparatus 310 comprises a base 320 which fixedly supports an A-side platen 340 and movably supports a B-side platen 350. The two platens 340, 350 each support the two halves of a core mold and a product mold as best shown in FIG. 15, discussed below. The core mold and product mold may be embodied in a single pair of mold blocks as shown, or may be arranged as separate mold blocks if desired. In addition, there would be one or more core mold cavities and one or more product mold cavities if desired. As with the embodiment of FIG. 1, the apparatus 310 includes an injection assembly 330 that includes a source 331 of plastic pellets, a feed mechanism 332, and a heated injection barrel 333 that forces molten plastic through a "sprue" in the A-side platen 340. Also present is a source of molten metal 383 and a suitable conduit (not separately numbered) for introducing molten metal into the core molding cavity (located at the bottom side of the platens 340, 350 in this particular case). The particular conduit used may be any suitable arrangement such as a flexible conduit that moves with the B-side platen 350 or a conduit that is fixed in location and engages a suitable entry orifice when the B-side platen 350 is moved to the closed position.

Figure 12:
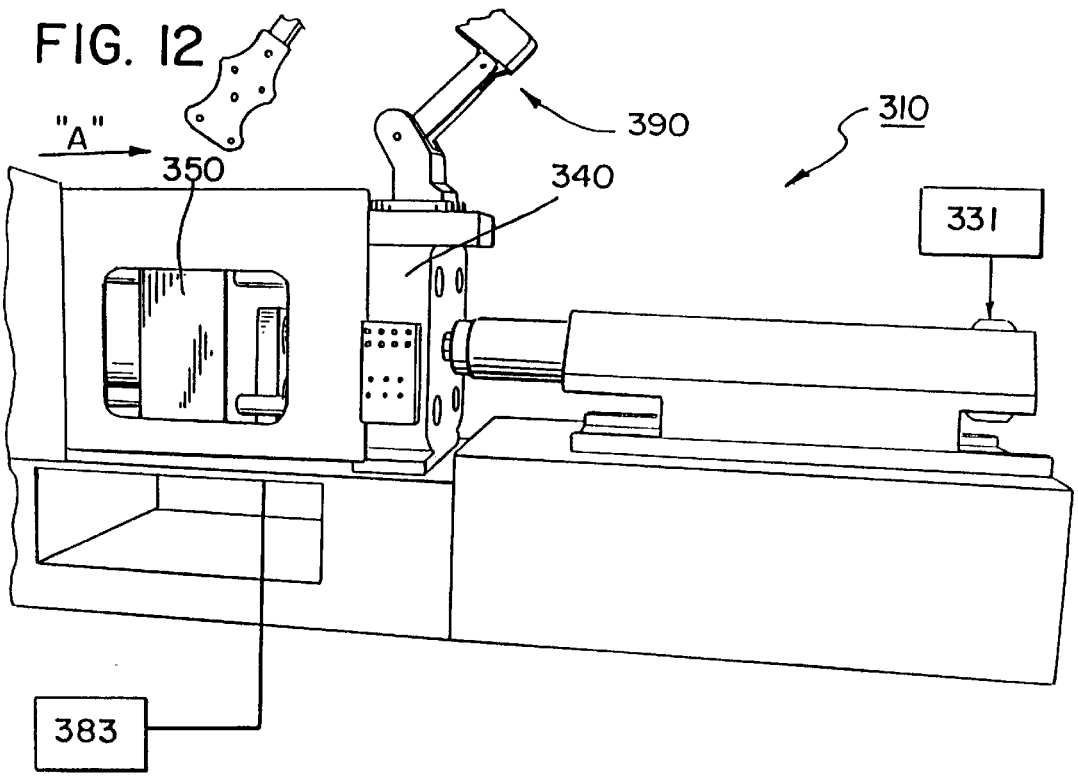
FIG. 12 shows the apparatus 310 with the B-side platen 350 being moved toward the A-side platen 340 at the start of a molding cycle.

As further shown in FIG. 12, a robot 390 is located adjacent to the apparatus 310. The robot 390, like the robot 90 of the first embodiment, includes and arm 391 which supports a gripping mechanism 392 at its distal end. In this case, however, the gripping mechanism 392 is a tandem mechanism that is capable of simultaneously grabbing a new core and a new overmolded assembly as will become clear below.

In FIG. 12, the robot 390 is held out of the way to allow the molding apparatus 310 to close and begin the molding operation. As suggested by Arrow "A" the B-side platen 350 is moved toward the A-side platen 340.

In FIG. 13, as suggested by the Arrow "B1" the B-side platen completes its closure and the full clamp tonnage is applied. Subsequently, the injection barrel 333 of the injection assembly 330 is pressed against the entry orifice or "sprue" of the A-side platen as suggested by Arrow "B2." At this point, therefore, with the full clamp tonnage applied, molten plastic is injected into the product mold and molten metal is simultaneously injected into the core mold.

In FIG. 14, as suggested by Arrow "C1" the B-side platen is moved leftward to open the core and product molds and the robot 390, as suggested by Arrow "C2," dives into the space between the two platens 340, 350.

In FIG. 15, the robot's arm 391 is positioned such that the gripping mechanism 392 is adjacent to a new core 100' and a new overmolded assembly 200' that was formed during the molding operation of FIG. 13.

Figure 16:
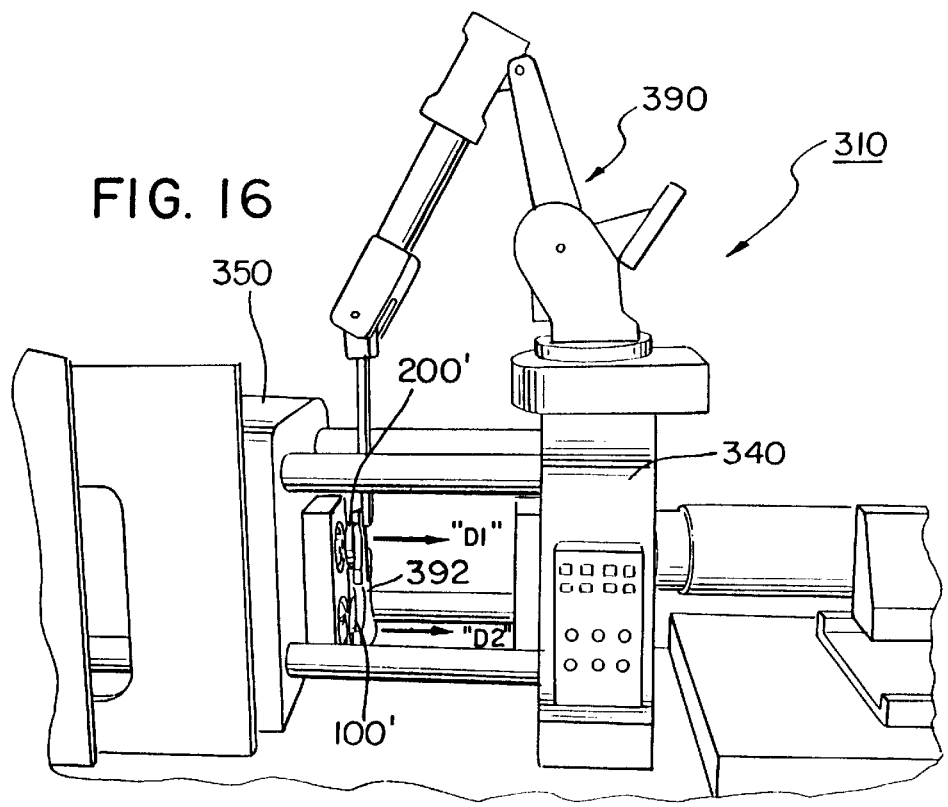
FIG. 16 shows the robot's gripping mechanism grabbing the new core and new overmolded assembly.

In FIG. 16, as suggested by Arrows "D1" and "D2," the new core 100' and the new overmolded assembly 200' are ejected toward the tandem gripping mechanism 392 which suitably grabs the core and overmolded assembly for transport upward (in the case of the core 100') and outward (in the case of the overmolded assembly 200').

Figure 17:
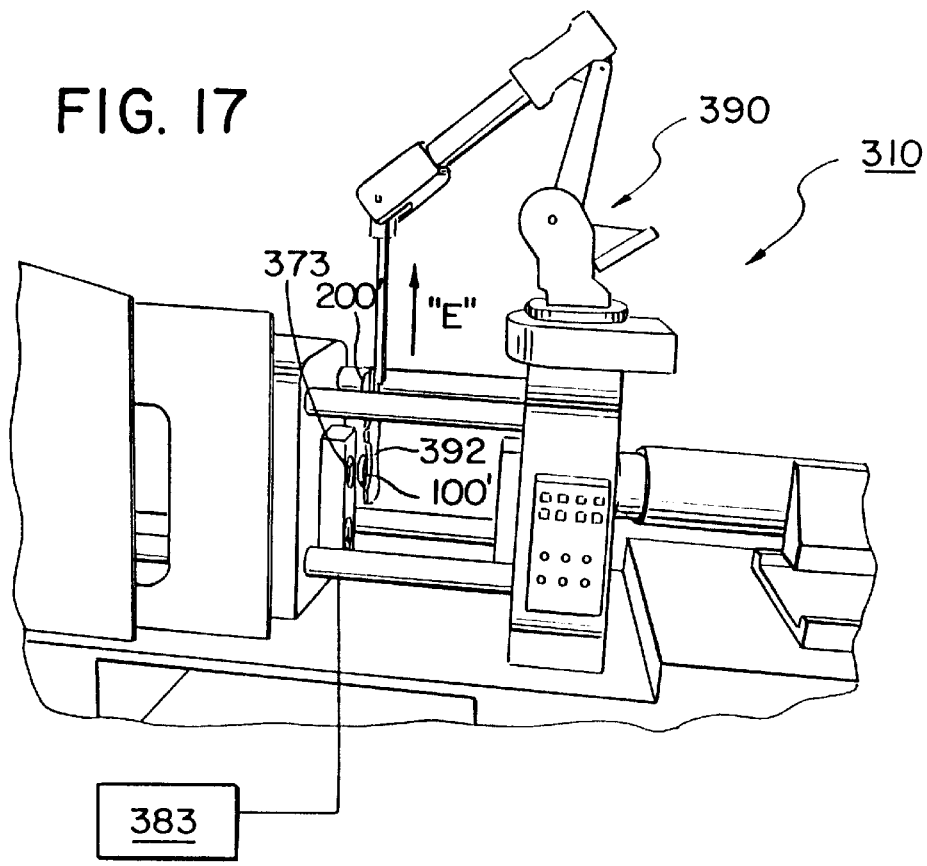
FIG. 17 shows the apparatus 310 with the robot 390 moving upward such that the new core is brought adjacent to the now empty overmold cavity.

In FIG. 17, as suggested by Arrow "E," the robot 390 is indexed upward such that the new core 100' at the bottom of the tandem gripping mechanism 392 is brought adjacent to the now empty product cavity 373.

Figure 18:
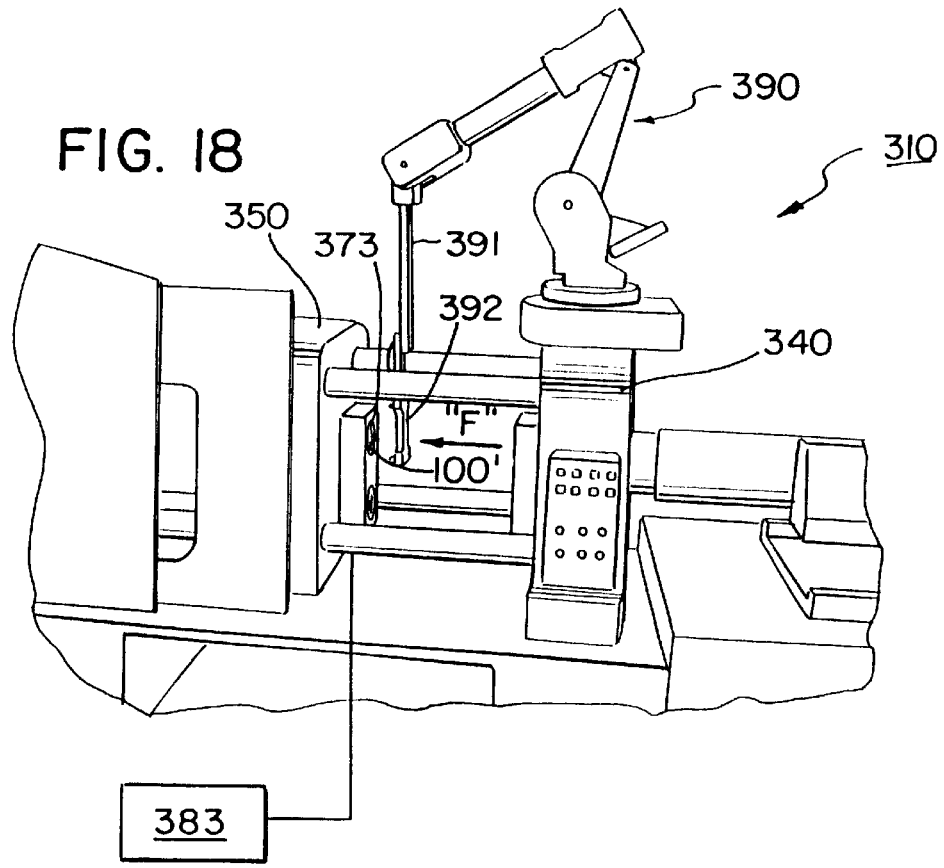
FIG. 18 shows the apparatus 310 with the robot 390 depositing the new core into the overmold cavity.

In FIG. 18, as suggested by Arrow "F," the core 100' is placed into the product cavity 373.

Figure 19:
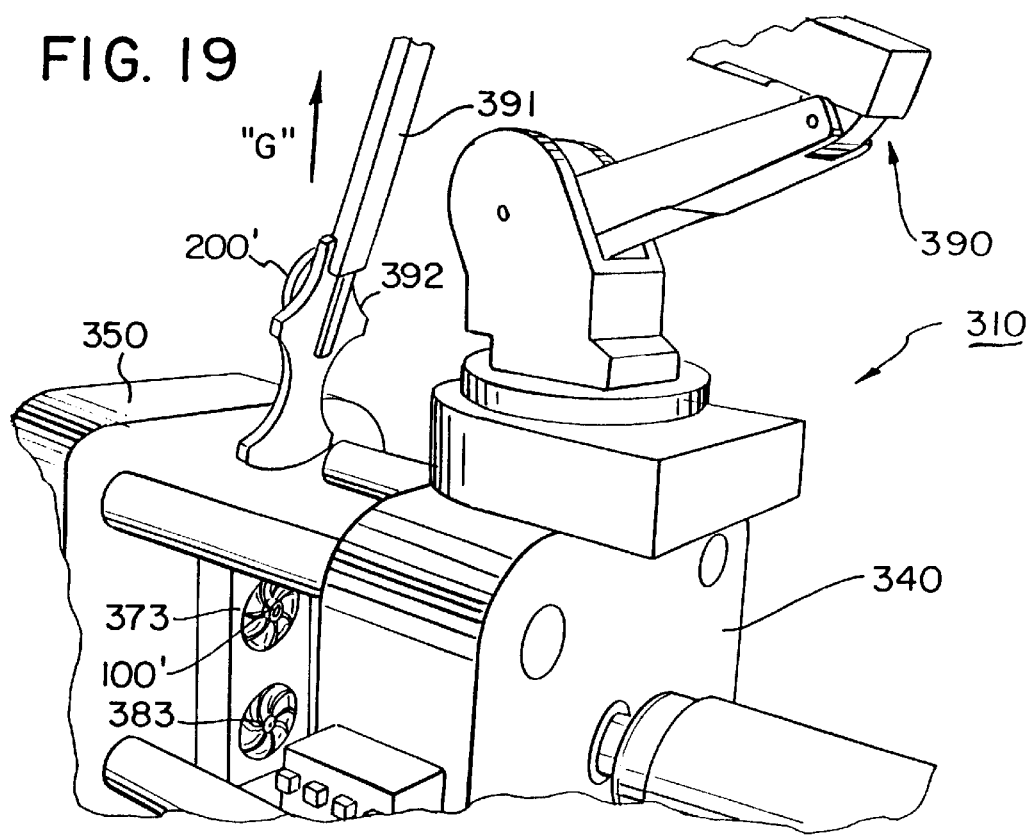
FIG. 19 shows the apparatus 310 with the robot 390 continuing upward with the new overmold assembly in hand.

In FIG. 19, as suggested by Arrow "G," the robot 390 now continues upwards such that its arm 391 and tandem gripping mechanism 392 carry the overmolded assembly upward and out of the space between the platens 340, 350. Note, as a result of the action taken in FIG. 18, the core 100' is left behind in the product mold 373 while the core mold 383 is empty. At this point, therefore, the product mold 373 and the core mold 383 are ready for a subsequent cycle.

Figure 20:
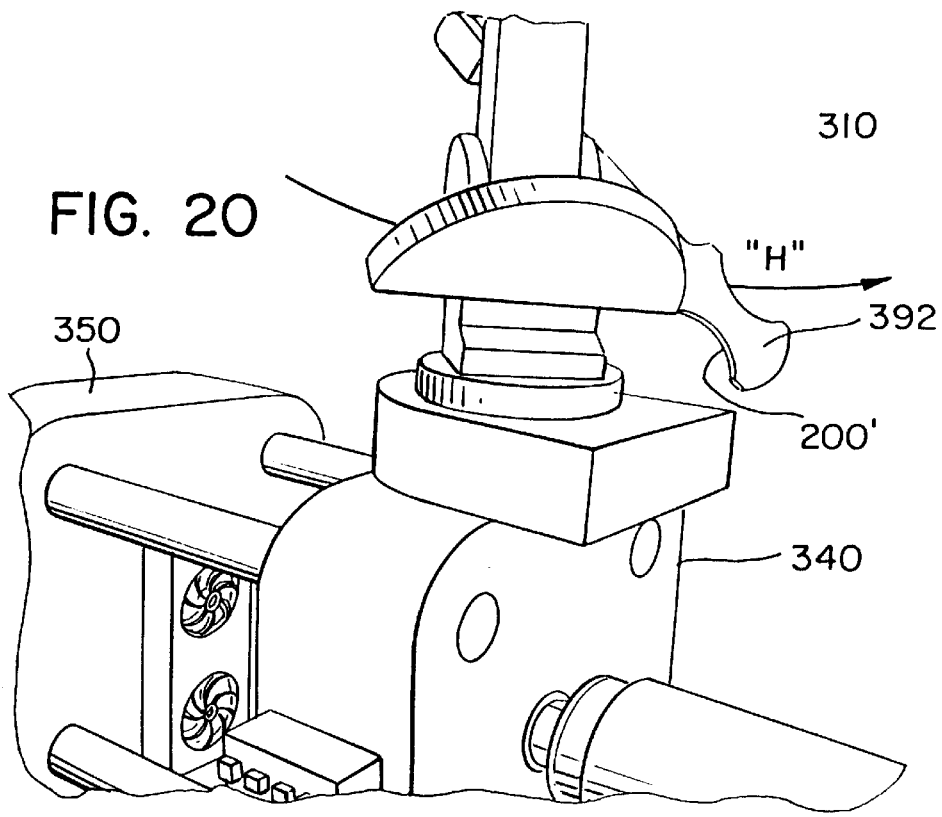
FIG. 20 shows the apparatus 310 with the robot moving away from the apparatus with the overmold assembly.

In FIG. 20, as suggested by Arrow "H," the robot moves away from the apparatus 310 with the new overmolded assembly 200' in hand. At this point, the platens 340, 350 could be brought together again to begin another cycle as shown beginning with FIG. 11 above.

Figure 21:
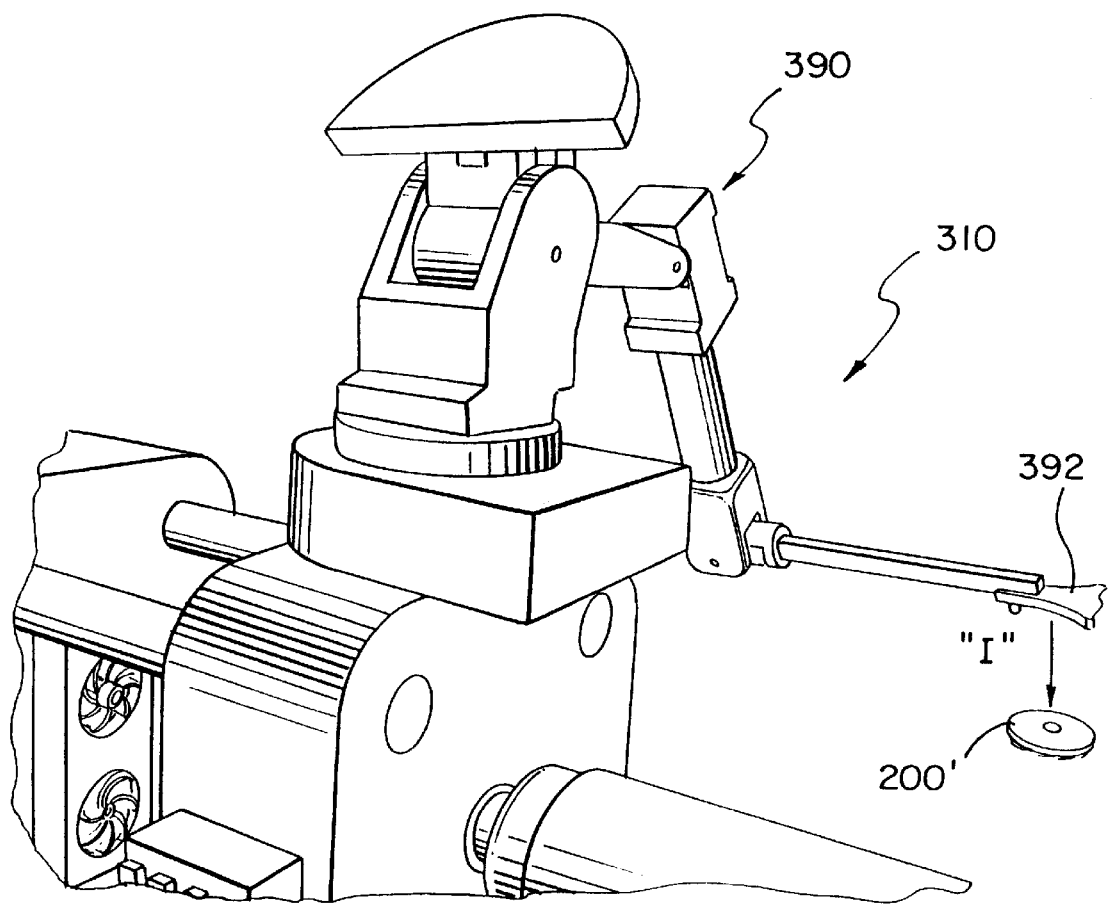
FIG. 21 shows the apparatus 310 with the robot "dropping" the overmold assembly so that it may proceed forward to the core melting station.

In FIG. 21, as suggested by Arrow "I," the robot 390 "drops" the new overmolded assembly so that it may proceed to a suitable core melting station which melts out the core material from inside of the product. FIG. 21 shows the overmolded assembly 200' being dropped, however it is more likely that the overmolded assembly 200' would be hung on a suitable mechanism for carrying the overmolded assembly 200' into and through a hot oil bath or other such suitable arrangement.

Two presently preferred embodiments of the invention have just been described, but it should be understood that numerous other modifications are possible without departing from the claimed invention. The first embodiment shows an apparatus 10 where the product and core molding regions are in a stacked arrangement between first and second platens on either side of an intermediate platen. The second embodiment shows an apparatus 310 where the core and product molding regions are arranged in a common plane between only first and second platens. In both cases, however, a new core 100, 100' and a new overmolded assembly 200, 200' are uniquely formed with the same clamp tonnage, thereby eliminating the need for separate core and product molding stations as required in the past. In the common plane arrangement of the second embodiment, the core and product molds are shown in an integrated and vertical arrangement but they could, of course, be separate, arranged horizontally relative to one another in that same common plane, or both. It is also possible in both embodiments to use core and product molds with multiple cavities to increase overall throughput.

I claim:

1. A method of producing a hollow plastic product comprising the steps of:

providing molten metal;

providing molten plastic;

providing an injection molding machine with first and second platens;

locating a core mold between the first and second platens;

locating a product mold between the first and second platens;

loading a previously formed core into the product mold;

closing the core mold and the product mold by bringing together the first and second platens;

clamping the core mold and product mold between the first and second platens with a common clamping force;

injecting molten metal into the core mold to form a new core;

injecting molten plastic into the product mold and around the previously formed core to form an overmolded assembly comprising a hollow plastic product that covers the previously formed core;

removing the common clamping force;

opening the core mold and the product mold by separating the first and second platens;

removing the new core from the core mold;

removing the overmolded assembly from the product mold; and loading the new core into the product mold.

2. The method of claim 1 further comprising the steps of melting the core out of the overmolded assembly to leave behind the hollow plastic product.

3. The method of claim 1 wherein the core mold and the product mold are arranged in a common plane between the first and second platens.

4. The method of claim 3 wherein the core mold and the product mold are arranged vertically relative to one another within the common plane.

5. The method of claim 3 wherein the core mold is below the product mold within the common plane.

6. The method of claim 3 wherein the core mold and the product mold are arranged horizontally relative to one another within the common plane.

7. The method of claim 1 wherein the core mold and the product mold are arranged in a stacked arrangement between the first and second platens.

8. The method of claim 7 wherein the core mold and the product mold are located on either side of an intermediate platen located between the first and second platens.

9. The method of claim 8 wherein the intermediate platen is slidably supported on and between a pair of support brackets that extend inwardly from one of the first and second platens.

* * * * *